United States Patent [19]

Cope

[11] 4,402,082
[45] Aug. 30, 1983

[54] AUTOMATIC LINE TERMINATION IN DISTRIBUTED INDUSTRIAL PROCESS CONTROL SYSTEM

[75] Inventor: Michael E. Cope, Richardson, Tex.

[73] Assignee: Foster Wheeler Energy Corporation, Livingston, N.J.

[21] Appl. No.: 202,471

[22] Filed: Oct. 31, 1980

[51] Int. Cl.³ .................... G06F 11/00; H04B 17/00
[52] U.S. Cl. .................................. 371/22; 371/11; 370/16
[58] Field of Search .............. 371/22, 11; 375/10; 370/14, 15, 16

[56] References Cited

U.S. PATENT DOCUMENTS

| | | | |
|---|---|---|---|
| 3,458,661 | 7/1969 | Forde et al. | 370/15 |
| 3,652,798 | 3/1972 | McNeilly et al. | 370/16 |
| 3,743,938 | 7/1973 | Davis | 371/22 |
| 3,824,547 | 7/1974 | Green et al. | 371/32 |
| 3,876,983 | 4/1975 | Zafiropulo et al. | 371/11 X |
| 4,002,847 | 1/1977 | Dail | 370/16 X |
| 4,009,469 | 2/1977 | Boudreau et al. | 370/16 X |
| 4,055,808 | 10/1977 | Holsinger et al. | 375/10 X |
| 4,186,380 | 1/1980 | Edwin et al. | 371/11 |
| 4,320,508 | 3/1982 | Takezoe | 371/22 |

Primary Examiner—David H. Malzahn
Attorney, Agent, or Firm—Marvin A. Naigur; John E. Wilson; Richard L. Aitken

[57] ABSTRACT

A control system for controlling an industrial process includes a plurality of remotely located process control units (remotes) each coupled to an associated input/output device(s) and adapted to communicate with one another through a dual channel communications link. Digital information in the form of data and control information blocks is transmitted between remotes with the blocks transmitted twice on each channel of the dual channel communications link. The destination remote checks the block validity on one of the dual channels and, if valid, responds with an acknowledgement signal (ACK), and, if invalid, tests the blocks on the other, alternate channel and then responds with an acknowledgement or non-acknowledgement signal (NAK) depending on whether the data blocks tested on the alternate channel are found valid or invalid. Each remote in the system is adapted to test the communication integrity of both channels of the communication link between it and its immediately adjacent remotes in the system and provide a line-balanced termination impedance in the event one or both communication channels are degraded or interrupted. The system thereby provides high overall operating efficiency since the remotes maintain a system-like integrity even if one of the communication links is interrupted by automatically inserting a line-matching termination impedance to prevent or minimize problems incident to unterminated interrupted or degraded communication links, these problems including loss of signal strength in the transmission line and reflected signals.

19 Claims, 22 Drawing Figures

FIG. 10A. INITIAL

| | $R_0$ | $R_1$ | $R_2$ | $R_3$ | $R_4$ |
|---|---|---|---|---|---|
| TRANSFER SUCCESSION ORDER | | | | | |
| RELATIVE SEQUENTIAL POSITION OF REMOTE FROM PRESENT MASTER | MASTER | FIRST | SECOND | THIRD | FOURTH |
| TRANSFER MONITOR TIME-OUT (MICRO-SEC.) | | 50 | 100 | 150 | 200 |

FIG. 10B. FIRST TRANSFER

| | $R_0$ | $R_1$ | $R_2$ | $R_3$ | $R_4$ |
|---|---|---|---|---|---|
| TRANSFER SUCCESSION ORDER | | ⇧ | | | |
| RELATIVE SEQUENTIAL POSITION OF REMOTE FROM PRESENT MASTER | MASTER | FIRST | SECOND | THIRD | FOURTH |
| TRANSFER MONITOR TIME-OUT (MICRO-SEC.) | | | 50 | 100 | 150 |

FIG. 10C. SECOND TRANSFER

| | $R_0$ | $R_1$ | $R_2$ | $R_3$ | $R_4$ |
|---|---|---|---|---|---|
| TRANSFER SUCCESSION ORDER | FOURTH | MASTER | FIRST ⇧ | SECOND | THIRD |
| RELATIVE SEQUENTIAL POSITION OF REMOTE FROM PRESENT MASTER | | | | | |
| TRANSFER MONITOR TIME-OUT (MICRO-SEC.) | 150 | | | 50 | 100 |

| THIRD TRANSFER | TRANSFER SUCCESSION ORDER | $R_0$ | $R_1$ | $R_2$ | $R_3$ | $R_4$ |
|---|---|---|---|---|---|---|
| | RELATIVE SEQUENTIAL POSITION OF REMOTE FROM PRESENT MASTER | THIRD | FOURTH | MASTER | FIRST | SECOND |
| | TRANSFER MONITOR TIME-OUT (MICRO-SEC.) | 100 | 150 | | | 50 |

FIG. 10D.

| FOURTH TRANSFER | TRANSFER SUCCESSION ORDER | $R_0$ | $R_1$ | $R_2$ | $R_3$ | $R_4$ |
|---|---|---|---|---|---|---|
| | RELATIVE SEQUENTIAL POSITION OF REMOTE FROM PRESENT MASTER | SECOND | THIRD | FOURTH | MASTER | FIRST |
| | TRANSFER MONITOR TIME-OUT (MICRO-SEC.) | 50 | 100 | 150 | | |

FIG. 10E.

| FIFTH TRANSFER | TRANSFER SUCCESSION ORDER | $R_0$ | $R_1$ | $R_2$ | $R_3$ | $R_4$ |
|---|---|---|---|---|---|---|
| | RELATIVE SEQUENTIAL POSITION OF REMOTE FROM PRESENT MASTER | FIRST | SECOND | THIRD | FOURTH | MASTER |
| | TRANSFER MONITOR TIME-OUT (MICRO-SEC.) | | 50 | 100 | 150 | |

FIG. 10F.

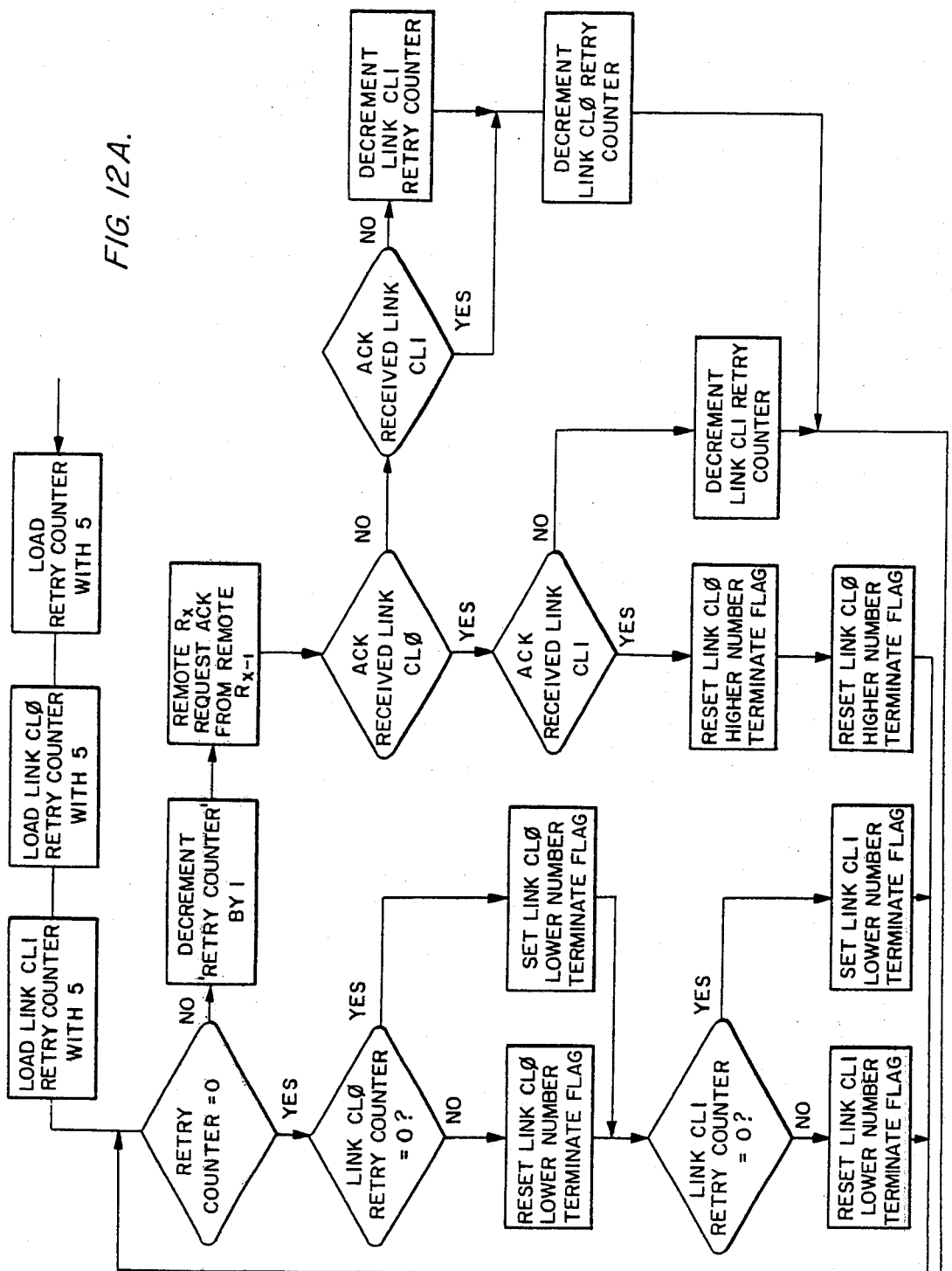

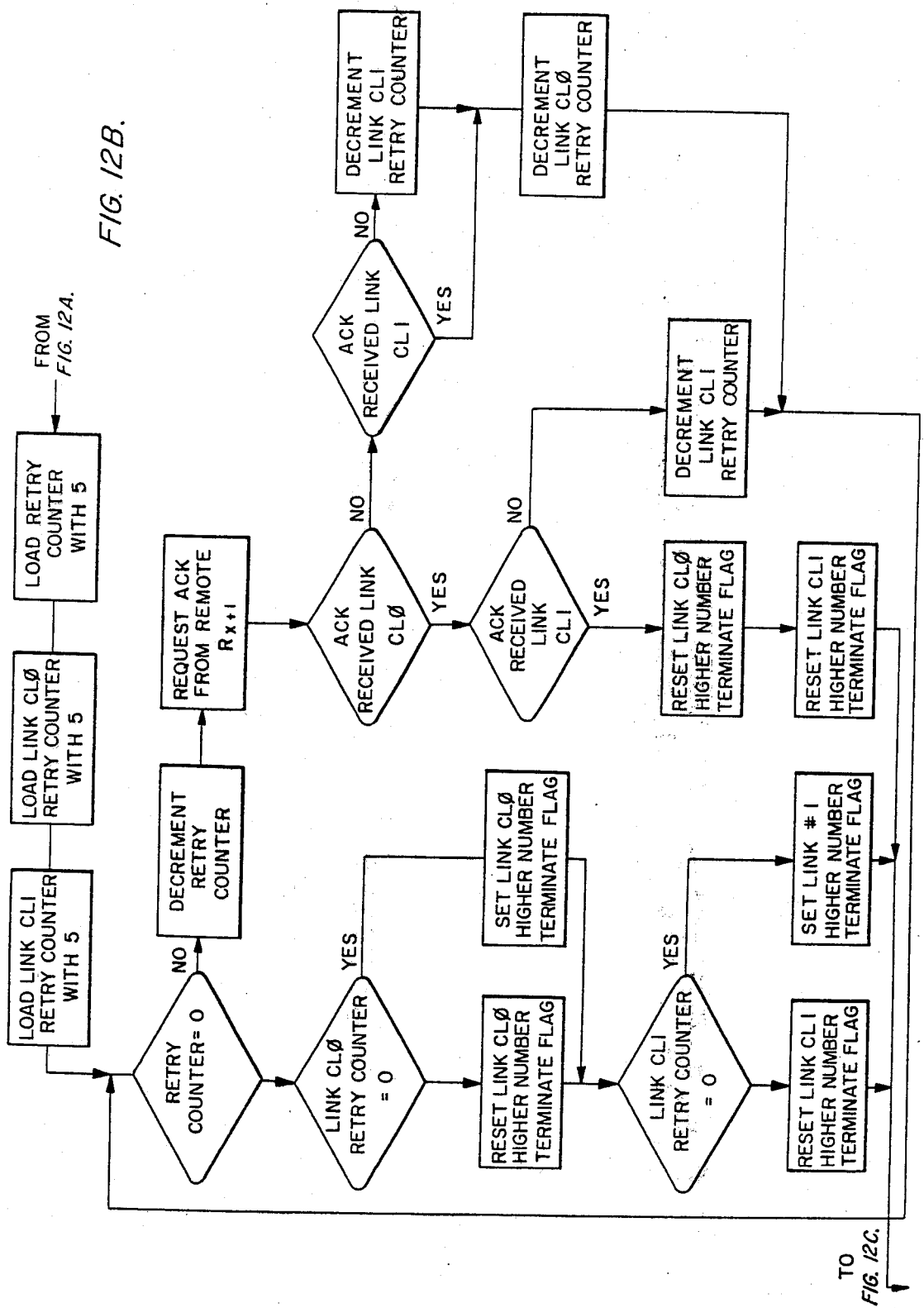

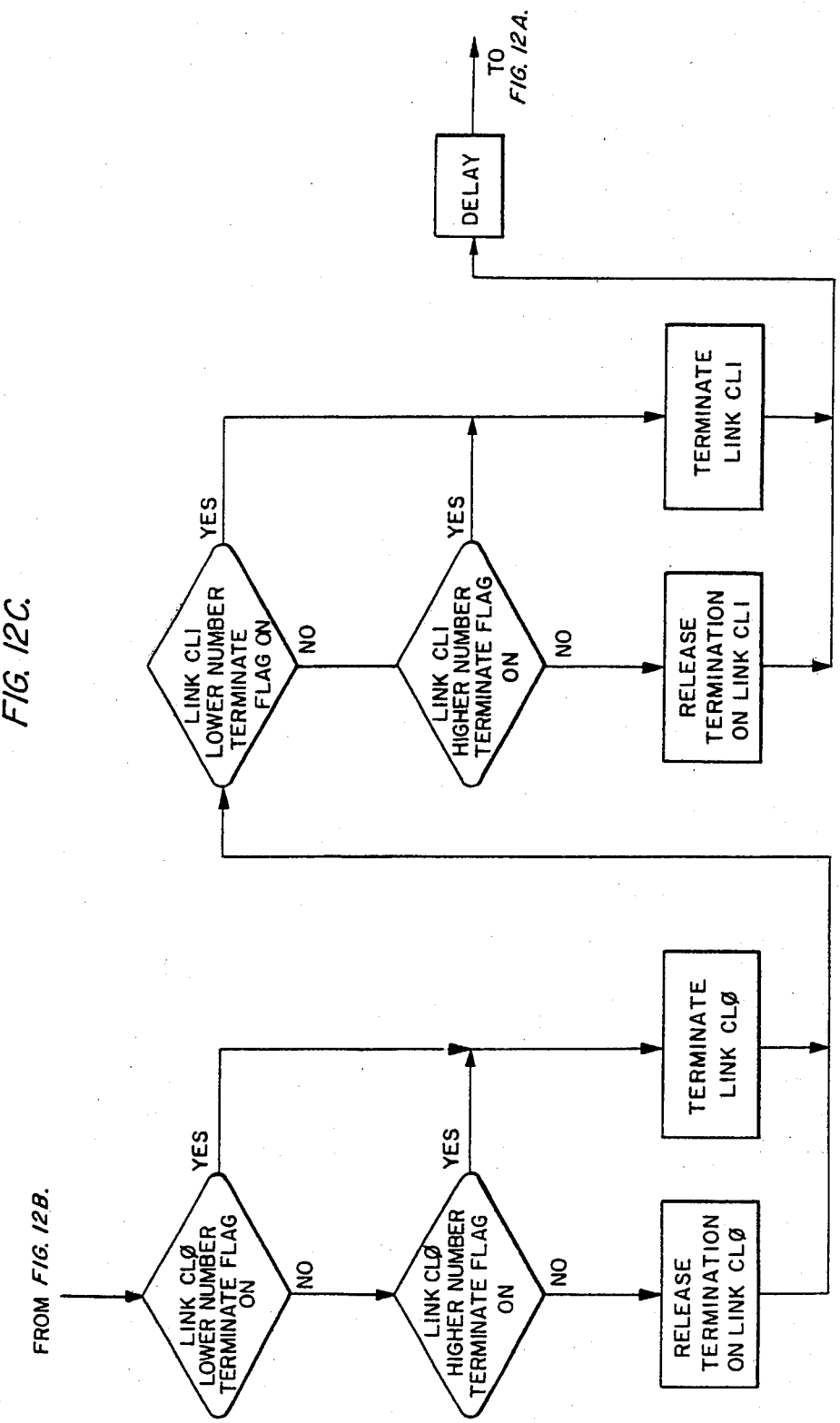

|  | RETRY COUNTER | CLO RETRY COUNTER | CLI RETRY COUNTER |
|---|---|---|---|
| INITIALIZATION | 5 | 5 | 5 |
| ATTEMPT 1 | 4 | 4 | 5 |
| ATTEMPT 2 | 3 | 3 | 5 |
| ATTEMPT 3 | 2 | 2 | 5 |
| ATTEMPT 4 | 1 | 1 | 5 |
| ATTEMPT 5 | 0 | 0 | 5 |

AUTOMATIC LINE TERMINATION IN DISTRIBUTED INDUSTRIAL PROCESS CONTROL SYSTEM

CROSS REFERENCE TO RELATED APPLICATIONS

The subject matter of the present application is related to the subject matter disclosed in co-pending U.S. patent applications Ser. No. 115,160 by B. Slater and Ser. No. 115,161 (now U.S. Pat. No. 4,304,001 by M. Cope, both filed on Jan. 24, 1980 and entitled, "Industrial Control System"; Ser. No. 159,597 filed on June 16, 1980 by C. Paredes and B. Slater and entitled, "Industrial Control System"; and Ser. No. 202,472 filed on even date herewith by M. Cope and entitled, "Status Change Logging in Industrial Process Control Systems."

BACKGROUND OF THE INVENTION

The present invention relates to control systems of the type having a plurality of remotely located process control units connected together through a communications link and, more particularly, to a control system in which each of the remote units is capable of testing the communication integrity of the communications link between it and other remotes in the system and automatically inserting a line-termination impedance when a degraded or interrupted channel in the communications link is detected.

Many system-type industrial installations, for example, those related to industrial process manufacturing and electrical power generation, employ a large number of physically distributed controlled-devices and associated sensors for effecting coordinated operation of the overall system. In the past, coordinated control of the various devices has been achieved by manually operated and various types of semi-automatic and automatic control systems including electromagnetic relay systems, hardwired solid-state logic systems, and various types of computer control systems. The computer systems have included central systems in which the various sensors and controlled devices are connected to a central computer; distributed control systems in which a remotely located computer is connected to each of the controlled devices and to one another; and hybrid combinations of the central and distributed systems. The successful functioning of the control system is vital to any industrial process, and, accordingly, distributed systems have generally been preferred over central systems because the failure of one of the remotely located control computers generally does not cause a system wide failure as in the case of the failure of the central computer in the central system. However, in the distributed systems, a communication link or buss interconnects each of the various remotes and deterioration or interruption of the communication link can effectively divide the system into inoperative portions. Such degradation or interruptions of the communication link can occur when the communication link physically passes through an area of high electrical noise that can induce errors into the data transmissions or where the communications link is actually severed. In the latter case, the open communications link causes an unbalanced line impedance which can adversely affect the data signal-current levels in the communications link. When the system transmits information in digital form at high and very high data rates, an interrupted transmission link can cause reflected signals which, in turn, can cause false triggering and garbled data transmission. In view of this, a control system must be able to detect a degradation or interruption of its communication link and be able to minimize the adverse affect on the communication capability of the remaining remotes in the system in order to maintain high reliability data transmission between remotes.

SUMMARY OF THE INVENTION

In view of the above, it is a broad overall object of the present invention, among others, to provide an industrial control system for controlling an industrial process or the like having a high overall system operating reliability.

It is also another object of the present invention to provide an industrial control system which can detect the degradation or interruption of the communication link and take steps to minimize the adverse affect such degradation or interruption has on communication between remotely located controlled devices.

It is another object of the present invention to provide an industrial control system defined by a plurality of remotely located process control units (remotes) interconnected through a communication link or buss with each of the remotely located units adapted to test the communication integrity of the communications link in accordance with a predetermined sequence.

It is still another object of the present invention to provide an industrial control system having a plurality of remotely located process control units interconnected through a link or buss in which high reliability information transfer is achieved between remotes even when one or more signal carrying channels of the communication link between remotes is interrupted or degraded.

In accordance with these objects, and others, the present invention provides a control system for controlling an industrial process including a plurality of remote process control units $R_n$ (remotes) connected to various controlled devices and sensors and communicating with one another through a communications link having at least two independent communication channels. Each remote is assigned a unique succession number or position in a predetermined succession order with each remote unit assuming supervisory communication control of the communications link on a revolving or master for the moment basis in accordance with the remote's relative position in the succession order. Information transfer including process data and command control information is accomplished between a source remote $R_s$ and a destination remote $R_d$ by successively transmitting two identical information blocks over each communication channel with the destination remote $R_d$ testing the validity of the blocks on one of the channels and, if valid, responding with an acknowledgement signal (ACK), and, if invalid, then testing the validity of the two blocks received on the other, alternate channel. An acknowledgement (ACK) or a non-acknowledgement signal (NAK) is sent by the destination remote $R_d$ if the information on the alternate channel is found, respectively, valid or invalid. Each remote in the system is adapted to test the communications integrity of both communications channels between it and its immediately lower order and higher order remote in the succession order and connect a line-balancing impedence thereto in the event that one or both of the communication channels are interrupted or degraded to the point where reliable information transfer can not take place.

The system advantageously maintains a high overall operating efficiency in the event of a communications link interruption since the remote on each side of the interruption will maintain, to the extent possible, a system-like integrity with a line-terminating impedance inserted by the remotes at the appropriate point in the communications link to prevent or minimize problems incident to the interruption or degradation of the communications link including loss of signal strength due to the unbalanced line conditions and reflected signals that can cause false triggering and the like.

BRIEF DESCRIPTION OF THE DRAWINGS

The above description, as well as the objects, features, and advantages of the present invention will be more fully appreciated by reference to the following detailed description of a presently preferred but nonetheless illustrative embodiment in accordance with the present invention when taken in connection with the accompanying drawings wherein:

FIGS. 10A through 10F are exemplary tables illustrating the manner in which supervisory control of the communication link is transferred from remote to remote;

FIG. 12A is a partial flow diagram illustrating in detail the manner by which an interrogating remote $R_x$ tests the communications integrity of the communications link between it and the next lower number remote $R_{x-1}$ in the succession order;

FIG. 12B is a partial flow diagram illustrating in detail the manner in which an interrogating remote $R_x$ tests the communications integrity of the communications link between it and the next higher number remote $R_{x+1}$ in the succession order;

FIG. 12C is a partial flow diagram illustrating in detail the manner by which the line termination impedence is applied to the communications link in the event of a communications link degradation or interruption;

DESCRIPTION OF THE PREFERRED EMBODIMENT

Figure 1:
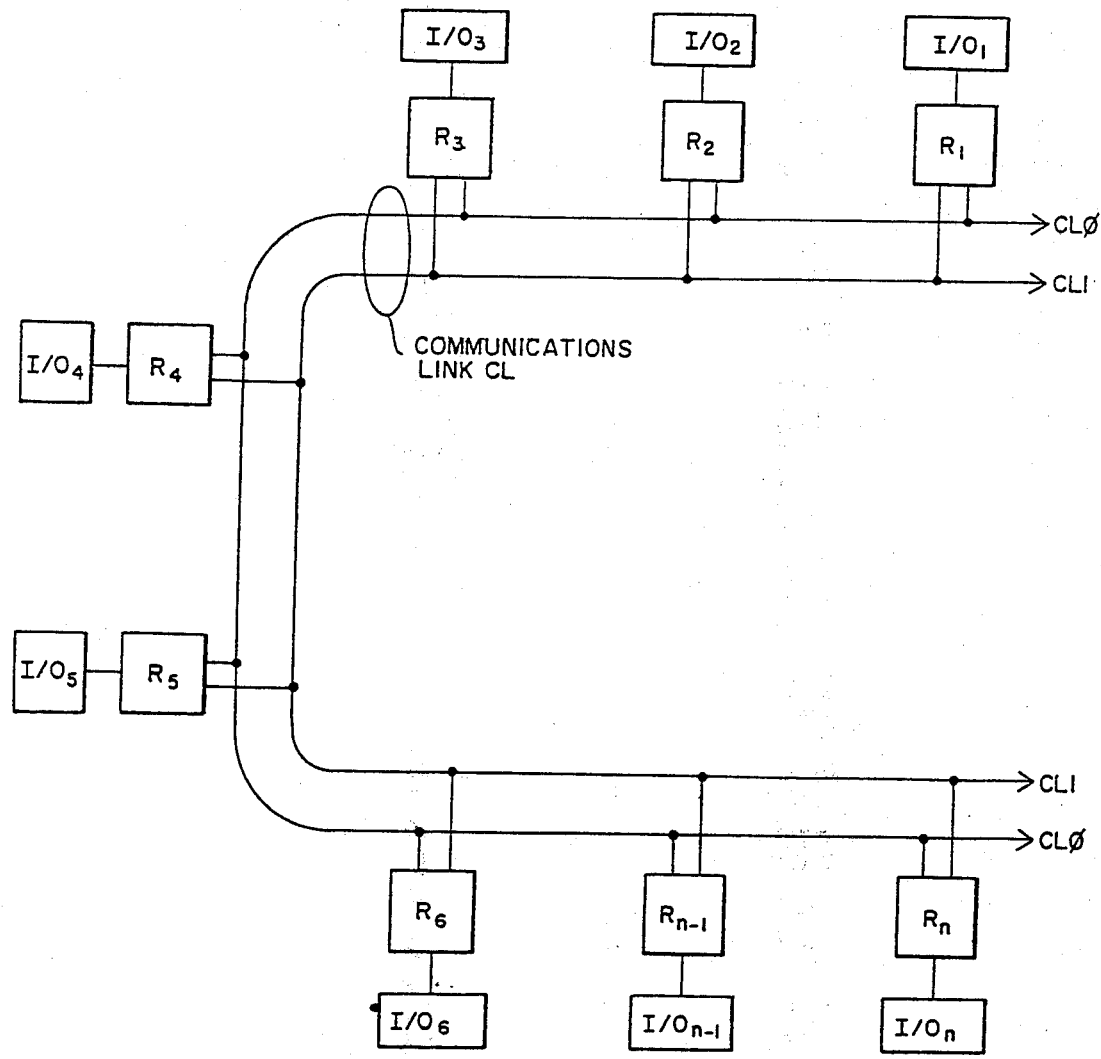
FIG. 1 is a schematic diagram of an exemplary process control system including a plurality of remote process control units (remotes) connected to a common, dual-channel communications link.

An industrial control system in accordance with the present invention is shown in schematic form in FIG. 1 and includes a communications link CL (C-link) having a plurality of remote process control units (remotes) $R_1$, $R_2, \ldots R_{n-1}$, $R_n$ connected thereto. The communications link CL is shown as an open line, double channel configuration formed from dual coax, dual twisted pair, or the like with the individual communication links identified, respectively, by the reference characters CL0 and CL1. While the system configuration shown in FIG. 1 is a distributed open loop or shared global buss type, the invention is equally suitable for application to central systems or central/distributed hybrid configurations. The system of FIG. 1 is adapted for use in controlling an industrial process, e.g., the operation of a power generating plant, with each remote unit $R_n$ connected to one or more associated or corresponding input/output devices $I/O_1, I/O_2, \ldots I/O_{n-1}, I/O_n$ such as, but not limited to, various types of sensors (temperature, pressure, position, and motion sensors, etc.) and various types of controlled devices (motors, pump, compressors, valves, solenoids, and relays, etc.)

Figure 2:
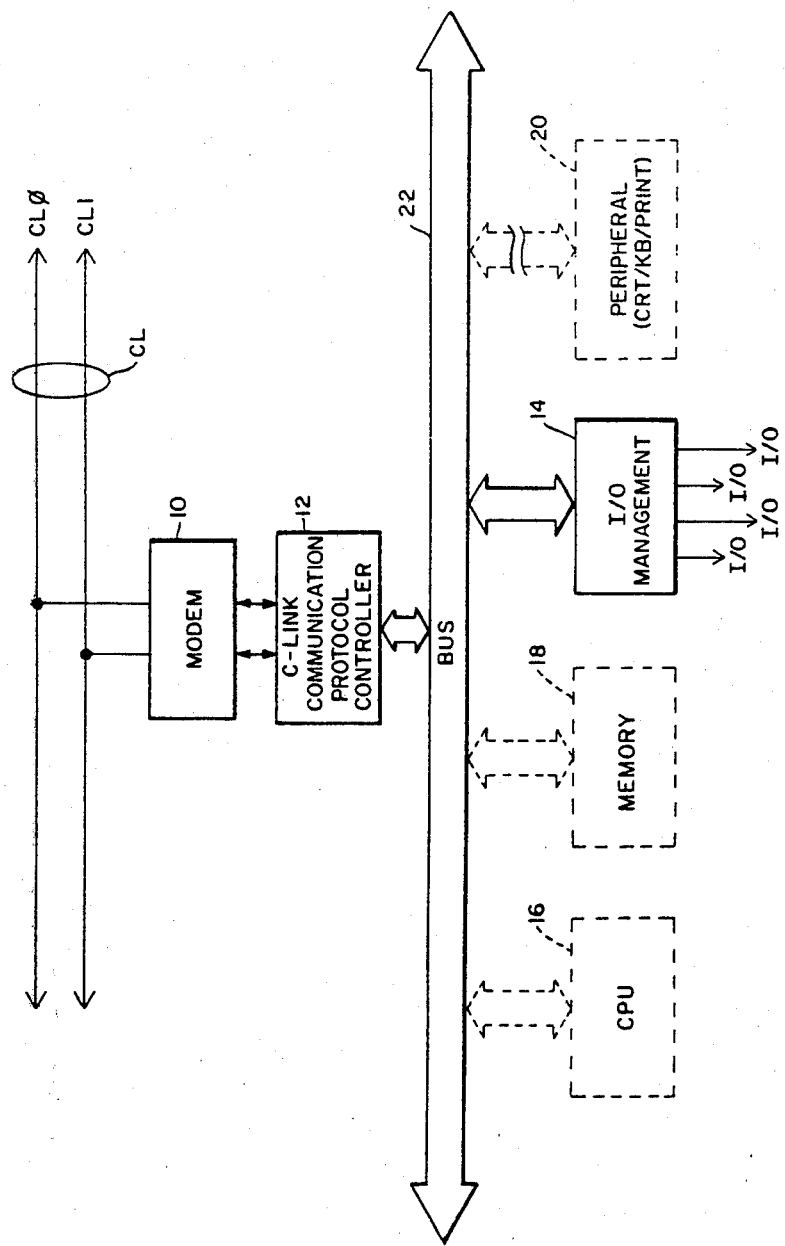
FIG. 2 is a schematic block diagram of an exemplary remote process control unit of the type shown in FIG. 1.

The architecture of an exemplary remote $R_n$ is shown in FIG. 2. While the architecture of the remote $R_n$ can vary depending upon the control process requirements, the remote shown in FIG. 2 includes a modem 10; a communication protocol controller 12; an input/output management device 14; a central processing unit (CPU) 16; a memory 18; a peripheral device 20 that can include e.g., a CRT display, a printer, or a keyboard; and a common buss 22 which provides addressing, control, and information transfer between the various devices which constitute the remote. The devices shown in dotted line illustration in FIG. 2 (that is, the central processing unit 16, the memory 18, and the peripheral device 20) are provided depending upon the process control requirements for the remote $R_n$. For example, in those remotes $R_n$ which function as an elemental wire replacer, only the modem 10, the communication protocol controller 12, and the input/output management 14 are provided. In those process control situations that require a measure of intelligence, an appropriately programmed central processing unit 16 and memory 18 are provided to effect active control according to a resident firmware program. In still other remotes requiring a human interface, the appropriate peripheral device(s) 20 may be connected to the common buss 22.

Figure 3:
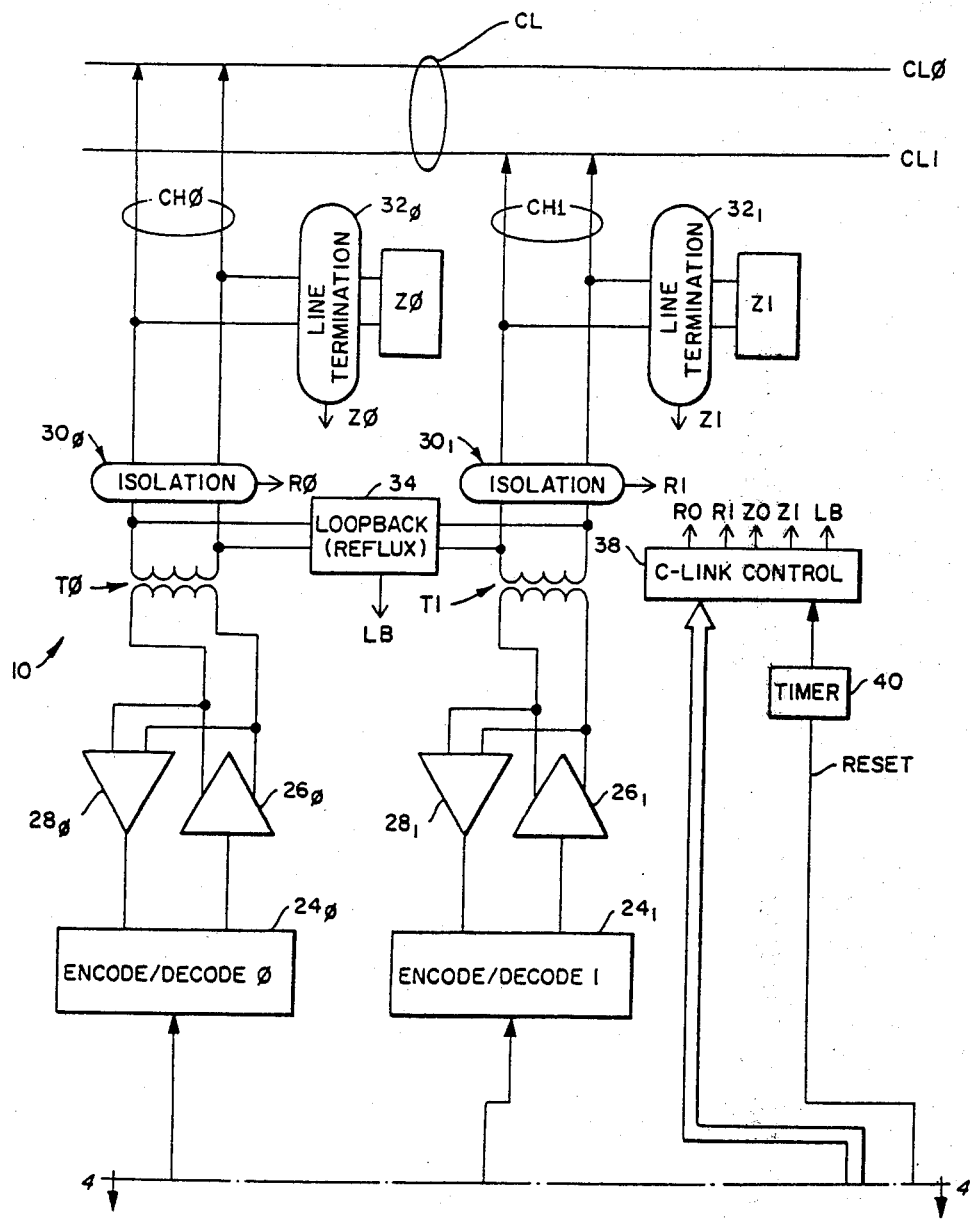
FIG. 3 is a schematic block diagram of an exemplary modulator/demodulator for the remote process control unit shown in FIG. 2.

As shown in more detail in FIG. 3, the modem 10 provides two independent communication channels CH$\emptyset$ and CH1 connected respectively to the communication links CL$\emptyset$ and CL1. Each of the communication channels CH$\emptyset$ and CH1 is provided with substantially identical communication devices, and a description of the communication devices of the first communication channel C$\emptyset$ is sufficient to provide an understanding of the second communication channel CH1. The communication channel CH$\emptyset$ includes an encoder/decoder 24$_\emptyset$ for providing appropriate modulation and demodulation of the digital data transmitted to and received from the communication link CL$\emptyset$. In the preferred form, the encoder/decoder 24$_\emptyset$ converts digital information in non-return-to-zero binary (NRZ) format to base-band modulation (BBM) signal format for transmission and effects the converse for reception. Amplifiers 26$_\emptyset$ and 28$_\emptyset$ are provided, respectively, to drive a passive coupling transformer T$\emptyset$ with digital information provided from the encoder/decoder 24$_\emptyset$ and provide amplified signals to the encoder/decoder 24$_\emptyset$ from the coupling transformer T$\emptyset$. A set of selectively operably relay contacts 30$_\emptyset$ is provided between the coupling transformer T$\emptyset$ and the corresponding communication link CL$\emptyset$ to effect selective interruption thereof to isolate the remote $R_n$ from the communications link CL, and another set of relay contacts 32$_\emptyset$ is provided to selectively connect a termination impedence Z$\emptyset$ across the communications link CL$\emptyset$. The termination impedence Z$\emptyset$ (the impedance of which preferably matches that of the particular transmission line used, e.g., coax, twisted pair, etc.) is used when the particular remote $R_n$ is at the end of the communications link CL ($R_1$ and $R_n$ in the case of FIG. 1) to provide proper termination impedence for the link and to assist in terminating the communications link CL on each side of a degraded or severed portion thereof between remotes, as described more fully below.

A selectively operable loop-back circuit 34 is provided to permit looping back or recirculation of test data during diagnostic checking of the remote $R_n$. While not specifically shown in FIG. 3, the loop-back circuit 34 can take the form of a double pole, single throw relay that effects connection between the channels CH$\emptyset$ and CH1 in response to a loop-back command signal 'LB'. During the diagnostic checking of a remote, which checking takes place when a particular remote is a master for the moment as explained below, the relay contacts of the loop-back circuit 34 are closed and a predetermined test word is sent from the channel CH$\emptyset$ to the channel CH1 and from the channel CH1 to the channel CH$\emptyset$ with the received word in each case being checked against the original test word to verify the transmit/receive integrity of the particular remote.

The isolation relays 30$_\emptyset$ and 30$_1$, the impedence termination relays 32$_\emptyset$ and 32$_1$, and the loop-back circuit 34 are connected to and selectively controlled by a communications link control device 38 which receives its communication and control signals from the communication protocol controller 12 described more fully below. A watch-dog timer 40 is provided to cause the C-link control device 38 to operate the isolation relays 30$_\emptyset$ and 30$_1$ to disconnect the remote $R_n$ from the communication link CL in the event the timer 40 times-out. The timer 40 is normally prevented from timing out by periodic reset signals provided from the communication protocol controller 12. In this way, a remote $R_n$ is automatically disconnected from the communication link CL in the event of a failure of the communication protocol controller 12.

Figure 4:
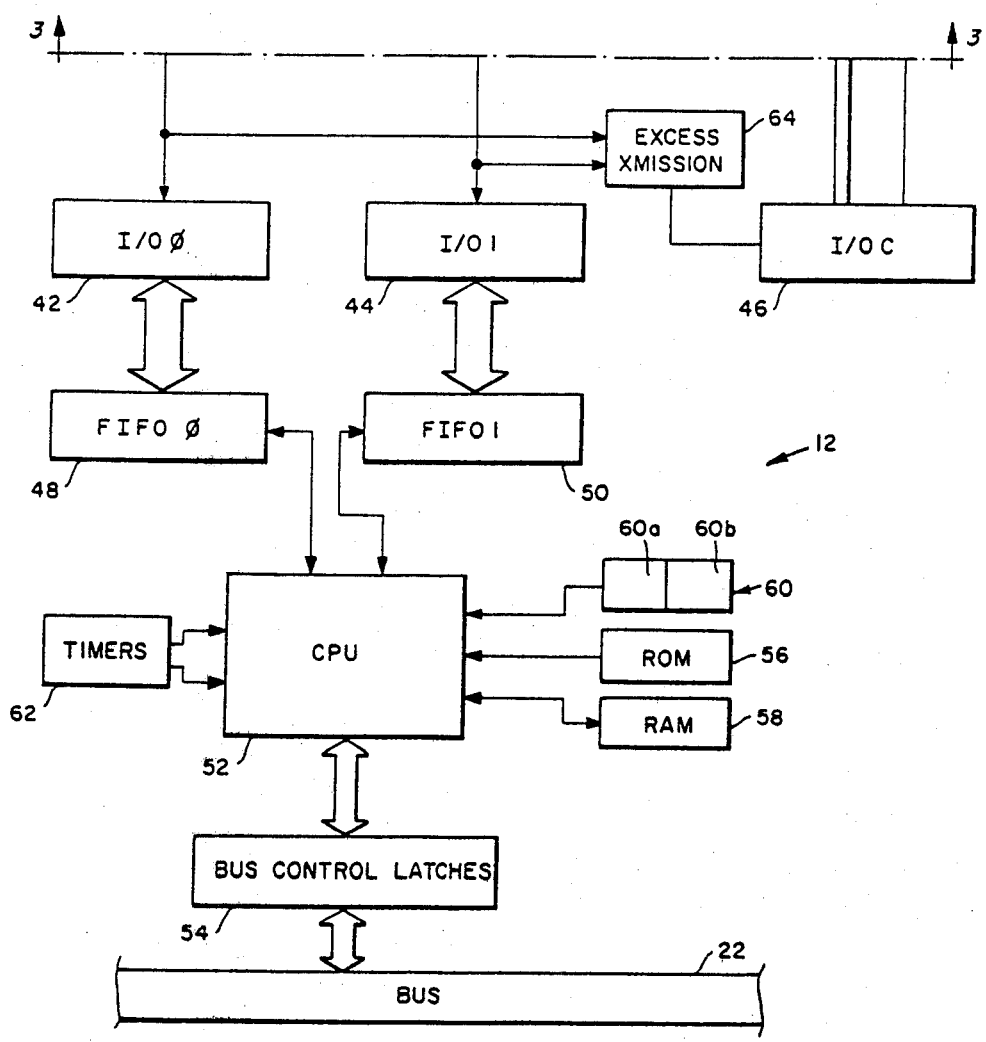
FIG. 4 is a schematic block diagram of an exemplary communication protocol controller for the remote process unit shown in FIG. 2.

As shown in more detail in FIG. 4, each communication protocol controller 12 includes input/output ports 42, 44, and 46 which interface with the above described modem 10 for the communication channels CH$\emptyset$ and CH1 and the C-link control device 38 (FIG. 3). A first-in first-out (FIFO) serializer 48 and another first-in first-out serializer 50 are connected between the input/output ports 42 and 44 and a CPU signal processor 52. The first-in first-out serializers 48 and 50 function as temporary stores for storing information blocks provided to and from the modems 10 as described more fully below. The CPU 52, in turn, interfaces with the buss 22 through buss control latches 54. A read only memory (ROM) 56 containing a resident firmware program for the CPU 52 and a random access memory (RAM) 58 are provided to permit the CPU to effect is communication protocol function as described more fully below. Timers 62 and a register 60 (for example, a manually operable DIP switch register or a hardwired jumpertype register) that includes registers 60$a$ and 60$b$ are also provided to assist the CPU 52 in performing its communication protocol operation. An excess transmission detector 64 connected to input/output ports 42 and 44 (corresponding to communication channels CH$\emptyset$ and CH1) determines when the transmission period is in excess of a predetermined limit to cause the C-link control device 38 (FIG. 3) to disconnect the transmitting remote from the communications link CL and thereby prevent a remote that is trapped in a transmission mode for monopolizing the communications link CL.

The input/output management device 14, a detailed description of which is not necessary to an understanding of the present invention, is preferably a firmware controlled microprocessor-based device which is adapted to scan the various input/output hardware points, effect data collection and distribution to and from the input/output points, format the collected data in preferred formats, and assemble the formatted data in selected sequences as well as place data in memory for subsequent transmission.

As mentioned above, one or more remotes $R_n$ may be provided with active processing capability by interfacing a central processing unit 16 and corresponding memory 18 with the remote buss 22. For example, in those remotes $R_n$ that monitor and control a specific operating characteristic of a process step, such as a temperature or pressure variable, a microprocessor 16 with an appropriate firmware program(s) can be provided to measure the actual operating characteristics, effect a comparison between the actual operating characteristic and the preferred set point, and effect one or more input/output actions in accordance with predetermined process control algorithms.

In the preferred embodiment, the signal processor for the CPU signal processor 52 is a 8×300 micro-controller manufactured by the Signetics Company of Sunnyvale, Calif., and the central processing unit 16, when used, is an 86/12 signal board 16-bit micro-computer manufactured by the Intel Company and adapted to and configured for the Intel MULTIBUS.

Figure 5:
FIG. 5 illustrates the format of an exemplary or illustrative information block for transferring information between remotes.

Each remote $R_n$ is adapted to communicate with the other by transmitting digital data organized in predetermined block formats. A suitable and illustrative block format 66 is shown in FIG. 5 and includes a multi-word header frame 66A, a multi-word data frame 66B, and a block termination frame or word 66C. Selected of the information block configurations are adapted to transfer process control information to and from selected remote units $R_n$ and other of the block configurations are adapted to transfer supervisory control of the communications link CL from one remote to the other remote as explained in greater detail below.

Figure 5A:
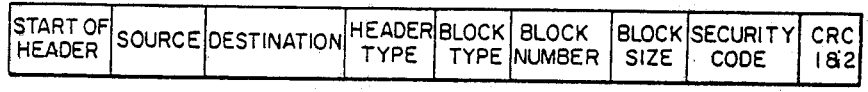
FIG. 5A illustrates the format of a header frame of the information block shown in FIG. 5.
Figure 5B:
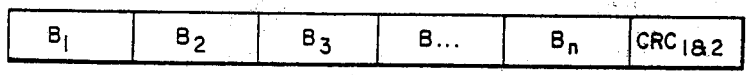
FIG. 5B illustrates the format for a data/information frame of the information block shown in FIG. 5.
Figure 5C:
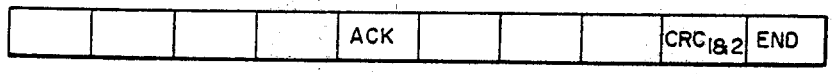
FIG. 5C illustrates the format of an acknowledgement block (ACK) for acknowledging successful receipt of an information block.
Figure 5D:
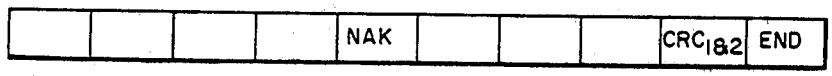
FIG. 5D illustrates the format for a non-acknowledgement block (NAK) for indicating the unsuccessful transmission of an information block between remotes.

An exemplary format for the header and data frames of an information block 66 is shown, respectively, in FIGS. 5A and 5B. The header frame 66A preferably includes a 'start of header' word(s) that indicates to all remotes that information is being transmitted; a 'source' identification word(s) that indicates identity of the source remote $R_s$ that is transferring the information; a 'destination' word(s) that indicates the identity of receiving or destination remote $R_d$; a 'header-type' word(s) that indicates whether the data block is transmitting data, a parametered command block, or a parameterless command block; 'block-type' word indicating the type of block (that is, a command block or a data block); a 'block number' word that indicates the number of blocks being sent; a 'block size' word indicating the length of the data frame; a 'security code' word(s) that permits alteration of the resident software programming in a remote; and, finally, a two-byte 'cyclic redundancy code' (CRC) validity word. The data frame for each data block, as shown in FIG. 5B, can include a plurality of data carrying bytes or words $B_1$, $B_2$, ... $B_n$ of variable length terminated with a two-byte cyclic redundancy code word. As described more fully below, each of the remotes is adapted to acknowledge (ACK) successful receipt of data and command blocks and non-acknowledge (NAK) the receipt of data in which a transmission error is detected. When transmitting an acknowledgement block or a non-acknowledgement block, the header format used is shown in FIGS. 5C and 5D in which an acknowledgement (ACK) or non-acknowledgement (NAK) word occupies the 'block-type' word position. The block formats disclosed above are intended to be illustrative only and not limiting.

The various remote units $R_1$, $R_2$, $R_3$, ... $R_n$ communicate with one another by having each remote successively take control of the communications link CL and then passing digital information between the controlling source remote $R_s$ and a destination remote $R_d$ using a double transmission alternate line technique that provides for high reliability data transfer between remotes even when one of the two communication links CL0 or CL1 is inoperative, for example, when one of the two communication cables is severed as occassionally occurs in harsh industrial environments.

When a remote unit assumes control of the communication link CL (as explained more fully below) and, as a source remote $R_s$, desires to send data blocks to another destination remote $R_d$, the data block is assembled at the source remote $R_s$ in accordance with the block formats discussed above in connection with FIGS. 5–5D and transmitted through the information channels CL0 and CL1 of the source remote $R_s$ to the communication links CL0 and CL1 with the header frame containing both the source remote $R_s$ and the destination remote $R_d$ identification information.

Figure 6:
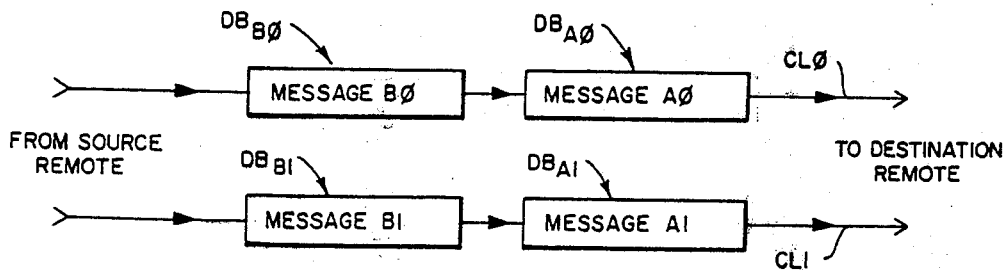
FIG. 6 illustrates, in pictorial form, two identical data blocks having the format shown in FIG. 5 successively transmitted on each communication channel of the communication link illustrated in FIG. 1.

In accordance with the data transmission technique, the communication protocol controller 12 of the source remote $R_s$ transmits the information blocks twice on each communication link CL0 and CL1 as schematically illustrated in FIG. 6 to provide a first data block $DB_A$ and then a second, following data block $DB_B$ on each communication link CL0 and CL1. The transmitted information block headers include the identity of the destination remote, $R_d$, which causes the destination remote $R_d$ to receive and act upon the information blocks. At the destination remote $R_d$, the two data blocks $DB_{A0}$ and $DB_{B0}$ on the communication link CL0 are passed through the communication channel CH0 and the two data blocks $DB_{A1}$ and $DB_{B1}$ on the communication link CL1 are passed through the communication channel CH1 to, respectively, the first-in first-out serializers 48 and 52 (FIG. 4).

Figure 7:
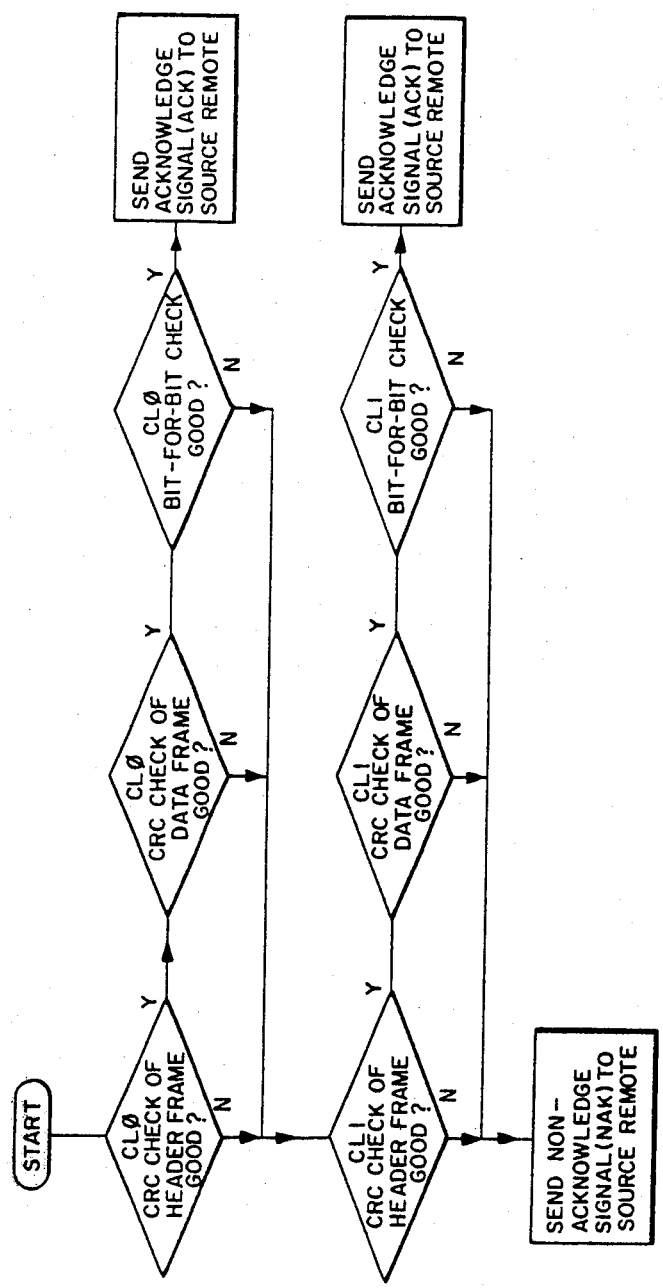
FIG. 7 is a flow diagram summary of the manner in which a source and a destination remote effect communications with one another.

As shown in the summary flow diagram of FIG. 7, the destination remote $R_d$ checks the validity of the received data by selecting one of the two communication links (e.g. CL0 in FIG. 7) and then checking the first data block on the selected line (that is, DBA0) by performing a cyclic redundancy check of the header frame and, if valid, performing a cyclic redundancy check of the data frame. If the data frame is valid, the communication protocol controller 12 of the destination remote $R_d$ then performs a bit-for-bit comparison between the CRC-valid first data block $DB_{A0}$ and the second data block $DB_{A0}$. If the bit-for-bit comparison is good, an acknowledgement (ACK) signal is sent from the destination remote $R_d$ to the source remote $R_s$ to indicate the receipt of valid information and complete that data block information transaction. On the other hand, if the CRC validity checks of the header or the data frame or the bit-for-bit comparison check indicate invalid data, the protocol controller 12 of the destination remote $R_d$ then selects the other, alternate line (in this case, CL1) and performs the aforementioned cyclic redundancy checks of the header and data frame and the bit-for-bit comparison between the first and second data blocks $DB_{A1}$ and $DB_{B1}$ on the alternate line CL1. If these checks indicate valid data on the alternate line, the destination remote responds with an acknowledgement signal to conclude the data block transmission transaction. On the other hand, if these checks indicate invalid data on the alternate line (which means that the data blocks on both the first-selected line and the alternate line are invalid) the destination remote $R_d$ responds with a non-acknowledgement signal (NAK) to cause retransmission of the data blocks from the source remote $R_s$. The non-acknowledgement block (NAK) includes a byte or bytes indicating the identity of the data block or blocks which should be retransmitted. A counter (not shown) is provided that counts the number of retransmissions from the source remote $R_s$ and, after a finite number of retransmissions (e.g. four), halts further retransmission to assure that a source remote $R_s$ and a destination remote $R_d$ do not become lost in a repetitive transmit/NAK/retransmit/NAK . . . sequence in the event of a hardware or software failure of the destination remote $R_d$ error checking mechanism.

Figure 8A:
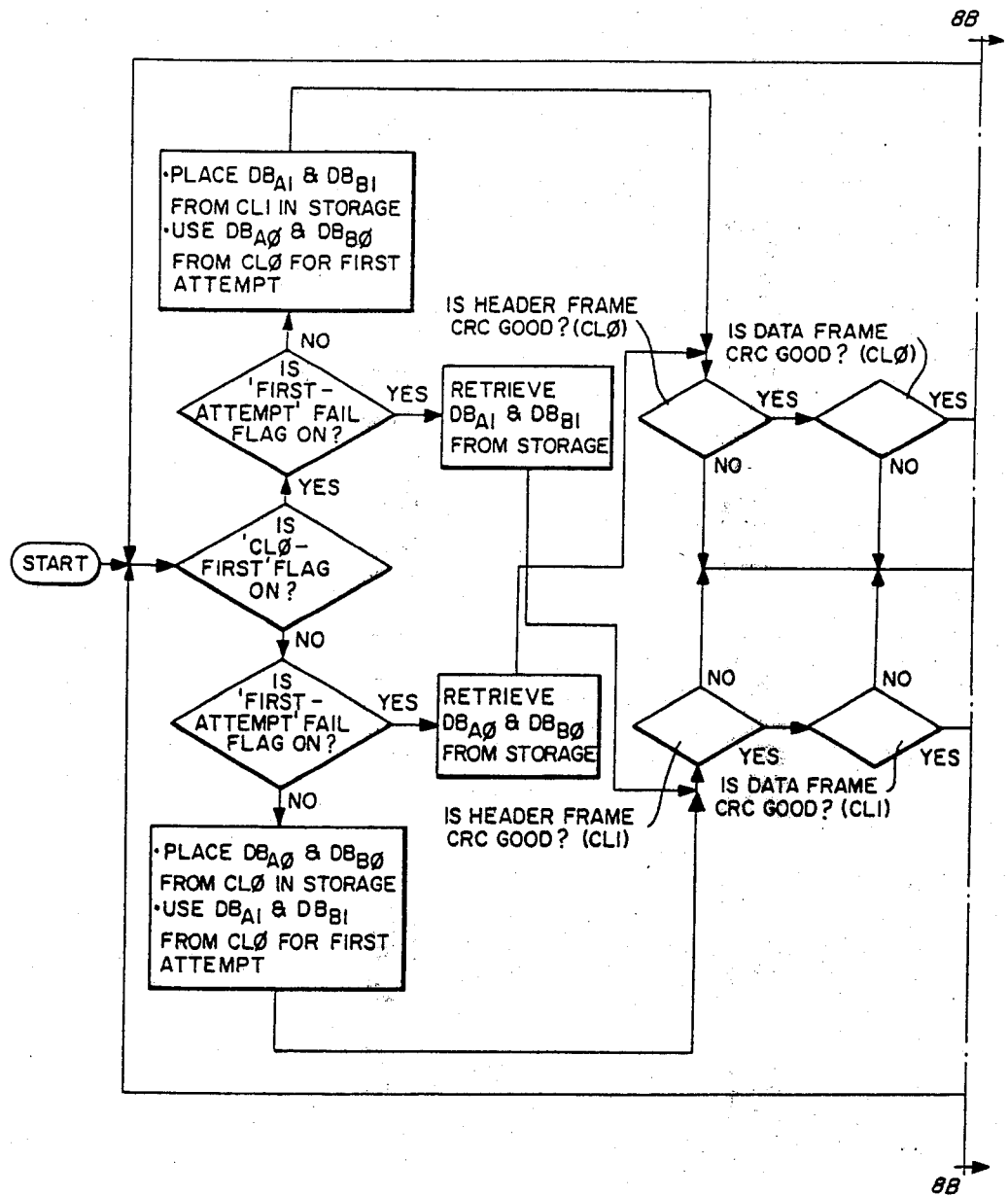
FIG. 8A is a partial flow diagrapm illustrating in detail the manner in which a source and a destination remote communicate and validate information transferred between one another.
Figure 8B:
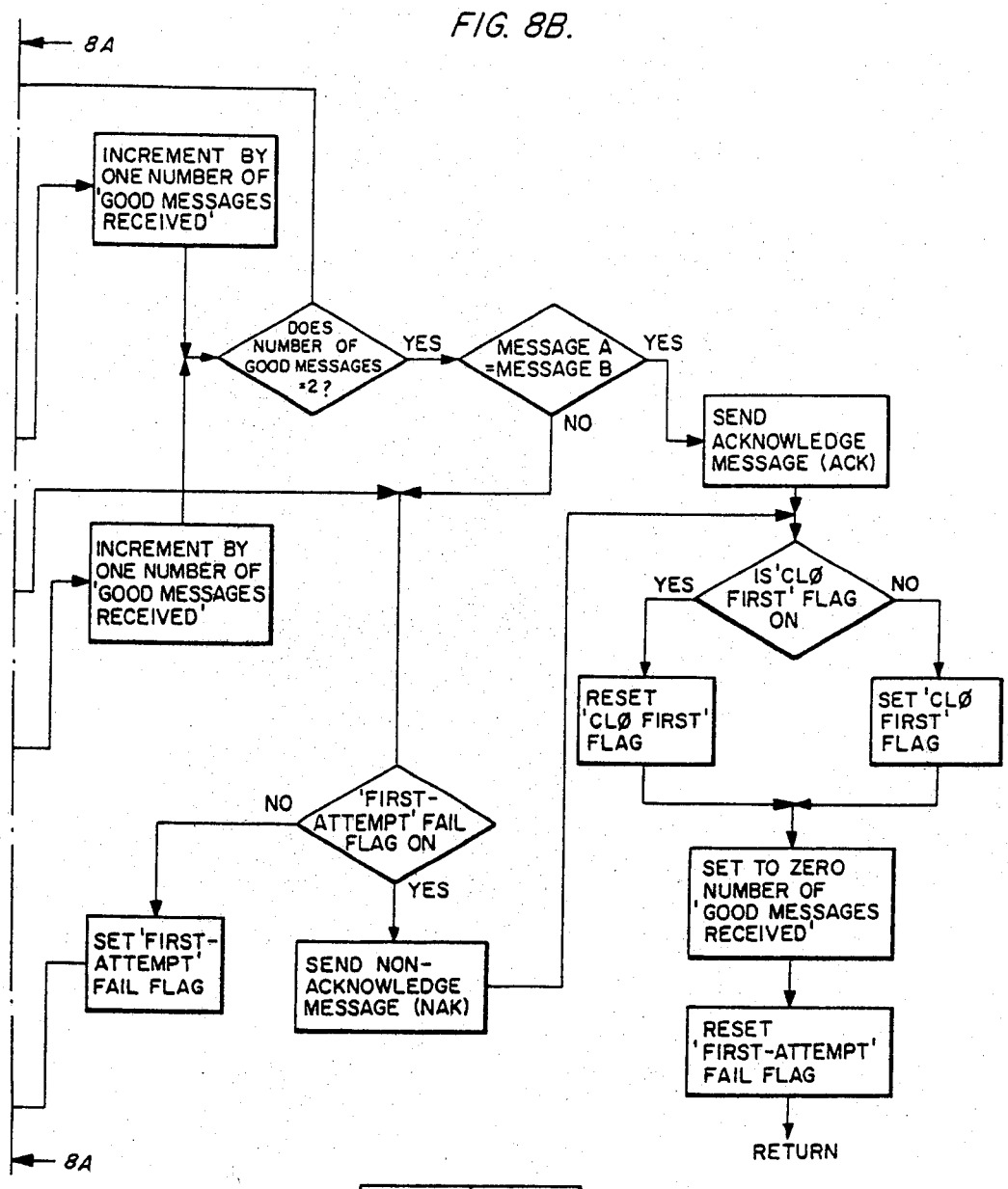
FIG. 8B is a partial flow diagram which completes the flow diagram of FIG. 8A and illustrates in detail the manner in which a source and a destination remote communicate and validate information transferred between one another.
Figure 9:
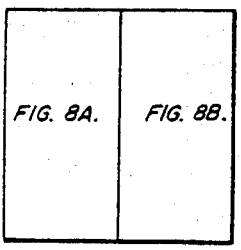
FIG. 9 is a legend illustrating the manner by which the flow diagrams of FIGS. 8A and 8B are to be read.

The double message alternate line checking sequence summarized in FIG. 7 may be more fully appreciated by referring to the detail flow diagram shown in FIGS. 8A and 8B (as read in accordance with the flow diagram map of FIG. 9). At the start of the information validity checking procedure, the 'line ∅-first' flag register is checked; if a flag is present the 'first-attempt fail' flag register is checked, and, if there is no flag in this register, the two data blocks $DB_{A1}$ and $DB_{B1}$ on channel CH1 are stored while the two data bocks $DB_{A\emptyset}$ and $DB_{B\emptyset}$ on channel CH∅ are used for the first attempt information check. Thereafter, the header frame of the first data block $DB_{A\emptyset}$ on channel CH∅ undergoes a CRC check and, if acceptable, the data frame of this data block $DB_{A\emptyset}$ undergoes a CRC check. If the header and data frames CRC checks indicate valid data, a 'good message' register is incremented. If the number of good messages is less than two, the error checking procedure returns to the initial part of the flow diagram and, after determining there is no channel CH∅-first flag or first-attempt flag present, checks the second, following data block $DB_{B\emptyset}$ by repeating the header and data CRC cyclic redundancy checks. If the header and data frames pass the CRC checks, the 'good message' register is incremented again to indicate that a total of two messages in succession (that is, $DB_{A\emptyset}$ and $DB_{\emptyset}$) have passed the cyclic redundancy check for the header and data frames. Thereafter the two data blocks $DB_{A\emptyset}$ and $DB_{B\emptyset}$ received on line CL∅ are checked by performing a bit-by-bit comparison between the two. If the data blocks $DB_{A\emptyset}$ and $DB_{B\emptyset}$ pass the bit-by-bit comparison test, the communications protocol controller 12 of the destination remote $R_d$ sends an acknowledgement (ACK) message to the source remote $R_s$ to conclude the information block transfer and resets the various registers. If, on the other hand, either the data block $DB_{A\emptyset}$ or $DB_{B\emptyset}$ on line CL∅ fail the header and data frame CRC checks or these two data blocks fail the bit-by-bit comparison check, the communication protocol controller 12 sets the 'first-attempt fail' flag and returns to the start of the procedure to determine that the 'CH ∅-first' flag and the 'first-attempt' fail flag are present. The communication protocol controller 12 then uses the stored data blocks $DB_{A1}$ and $DB_{B1}$ from line CL1 (which data blocks were previously stored in FIFO 50). The header block and data block of the data blocks $DB_{A1}$ and $DB_{B1}$ from line CL1 undergo the CRC check and, if successful, cause the incrementing of the 'good message received' register to cause the communication protocol controller 12 to then check the validity of the second data block $DB_{B1}$. If the data blocks $DB_{A1}$ and $DB_{B1}$ pass the CRC checks, they are compared with one another in a bit-by-bit comparison test and if this comparison check is successful, an acknowledgement (ACK) is sent. If on the other hand, either data block $DB_{A1}$ or $DB_{B1}$ does not pass the CRC check or the data blocks do not pass the bit-for-bit comparison test, a non-acknowledgement (NAK) signal is sent to the source remote $R_s$ including information requesting the retransmission of the data blocks which failed the validity test at the destination remote $R_d$. The source remote $R_s$ then retransmits the improperly received information blocks as described above with retransmission limited to a finite number. A register is provided for each of the communication links for recording, in a cumulative manner, the number of times a invalid message is received for each communication link. In this manner, it can be determined, on a statistical basis, whether one of the two communication links has suffered a deterioration in signal transmission capability and, of course, whether one of the communication links is severed.

As can be appreciated, the dual transmission of the identical messages on plural communication links vastly enhances the ability of the destination remote $R_d$ to detect errors and determine whether the information being transmitted is valid or not. In addition, the destination remote $R_d$ is able to operate and successfully receive messages even if one of the communication links is severed since the communication protocol controller 12 at the destination remote $R_d$ will examine the received signals on each line (CL∅ and CL1) and will find invalid data on the severed line but will always examine the data blocks on the other line, and, if necessary, request retransmission of the information blocks.

In selecting one of the two channels CH∅ or CH1 for the first validity check, it is preferred that one of the two channels (e.g. CH∅) be selected for the first check on every other information transaction and that the other of the two channels (e.g. CH1) be selected for the first check for the other information transactions. While the system has been disclosed as having dual communication links CL∅ and CL1, the invention is not so limited and can encompass more than two communication links with the remotes adapted to sequentially examine signals received on the various channels.

As mentioned above, each remote $R_n$ of the control system is adapted to accept and then relinquish supervisory control of the communication link CL on a master for the moment or revolving master arrangement. The communication protocol controller 12 of each remote $R_n$ includes a register which contains the remote succession number, another register which contains the total number of remotes in the system, and another register which contains the relative position of the remote from the present system master. The first two registers are schematically illustrated by the reference character 62 in FIG. 4. In addition, each remote $R_n$ includes a variable transfermonitor timer, the time-out interval of which is set in accordance with a predetermined control-transfer time constant (50 micro-seconds in the preferred embodiment) and the position of the particular remote relative to the present system $R_m$ master to permit, as explained in more detail below, the master for the moment transfer to continue even in the event of a disabled remote (that is, a remote that is unable to accept supervisory control because of a malfunction). Another timer is provided to force transfer of supervisory control of the communications link CL in the event a remote, because of a malfunction, is unable to transfer supervisory control to its next successive remote. The operation of the master for the moment transfer technique can be appreciated by consideration of the following example of an illustrative system that includes five remotes arranged in the open loop configuration of FIG. 1 and transferring supervisory control of the communications link CL in accordance with the tables of FIGS. 10A–10F. The upper row of each table indicates the succession sequence or order of the five remotes $R_0$, $R_1$, $R_2$, $R_3$, and $R_4$ that comprise the system; the intermediate row identifies the remote that is the present master $R_m$ for the moment and also identifies the relative successive position of the other remotes from the present master, that is, the first (or next) successive remote $R_{m+1}$ from the present master, the second successive remote $R_{m+2}$ from the present master, the third remote $R_{m+3}$ from the present master, etc.; and the third row of each table lists the setting of the variable transfer-monitor timer for the particular remote.

The system is provided with initialization software so that the first remote in the succession order $R_0$ assumes supervisory control of the communication link CL after system start-up and becomes the initial master $R_m$ of the system (FIG. 10A). When the initial master $R_0$ is in control of the communications link CL, it can send data to any of the other remotes, request status or other data from another remote, check the communications integrity of the communications link between it and the other remotes, and send control blocks and the like over the communications link. When the master $R_0$ determines that it no longer desires possession of the communications link CL, it passes supervisory control of the communications link CL to the next or first successive remote in accordance with the succession order. Thus, when the present master $R_0$ concludes its information transfer transactions, it transfers supervisory control of the communications link CL to its next or first successive remote $R_1$ by transmitting a control block to the remote $R_1$ with all the remaining remotes (that is, $R_2$, $R_3$, $R_4$) being cognizant of the transfer of supervisory control from the present master $R_0$ to its first or next successive remote $R_1$. Since, in the present system, the transfer of supervisory control of the communications link CL is expected to take place within 50 microseconds, the second successive remote $R_2$, as shown in the third row of the table of FIG. 10B, sets its variable transfer-monitor timer to 50 micro-seconds, the third successive remote $R_3$ sets its variable transfer-monitor timer to 100 micro-seconds, and the fourth successive remote $R_4$ sets its transfer-monitor timer to 150 microseconds. When the first successive remote $R_1$ receives the control block from the present master $R_0$, it accepts supervisory control of the communications link CL by responding with an acknowledgement message (ACK). If the control block is mis-received, the first successive remote $R_1$ can respond with an non-acknowledgement (NAK) to request retransmission of the control block transferring supervisory control of the communications link CL. During the time interval that the present master remote $R_0$ is attempting to transfer supervisory control of the communication link CL to its next successive remote $R_1$, the transfer-monitor timers of the remaining remotes are counting-down. If, for any reason, the next or first successive remote $R_1$ fails to take control (e.g. a malfunction of the remote), the transfer-monitor timer of the second successive remote $R_2$ will time-out at 50 micro-seconds and cause the second successive remote $R_2$ to then accept supervisory control of the communication link CL from the present master $R_0$ and thus bypass an apparently malfunctioning first successive remote $R_1$.

Assuming that the initial system master $R_0$ successively transfers supervisory control of the communications link CL to its first successive remote $R_1$, that successive remote $R_1$ then becomes the present master with the remaining remotes changing their position relative to the present master and setting their transfer-monitor timers in accordance with the second and third rows of the table of FIG. 10B. When the present master $R_1$ concludes its information transfer transactions, if any, it attempts to transfer supervisory control to its first or next successive remote $R_2$ by sending an appropriate control block to remote $R_2$ which responds with an acknowledgement signal (ACK), or, in the event of a mistransmission of the control block, a non-acknowledgement signal (NAK) which causes retransmission of the control block. When the control block requesting transfer of supervisory control of the communication link CL is sent from the present master $R_1$ to its next successive remote $R_2$, all the remaining remotes reset their transfer-monitor timers in accordance with their position relative to the present remote as shown in the third row of the table of FIG. 10C. Should the next successive remote $R_2$ be unable to accept supervisory control of the communication link CL from the present master $R_1$, the transfer-monitor timer of the second successive remote $R_3$ will time-out in 50 micro-seconds and cause the second successive remote $R_3$ to assume supervisory control of the communications link CL to thereby bypass an apparently malfunctioning first successive remote $R_2$. As can be appreciated from a review of the transfer-monitor time-out settings of the various remotes, supervisory control of the communications link C1 will transfer even if one or more successive remotes are malfunctioning, when the transfer-monitor timer of the next operable remote times out. This transfer sequence continues in succession as shown in the remaining tables of FIGS. 10D to 10F with supervisory control of the communication link CL being passed from remote to remote in succession with the last remote $R_4$ returning supervisory control to the first remote $R_0$.

By employing a master for the moment transfer technique in which the receiving remote acknowledges control from the transferring remote and in which retransmission of a mis-received control block is provided for in response to a non-acknowledgement signal from the receiving remote, it is possible to positively transfer supervisory control of the communication link. This technique advantageously transfers control using the data and information carrying communication link CL rather than providing, as in other systems, separate communication lines or channels dedicated solely to supervisory control transfer functions. Also the provision of a variable transfer-monitor timer at each remote that is set in accordance with the remote's relative position to the present master and a transfer time-constant automatically transfers supervisory control of the communications link even if one or more of the successive remotes are malfunctioning.

Each remote $R_n$, as described above, is provided with termination impedances Z∅ and Z1 for the first and second communication channels CH∅ and CH1 (FIG. 3) and a line termination relay $32_0$ and $32_1$ under the control of the communications link control device 38. The termination impedances are connected across each channel of the communications link when the particular remote is the first or the last remote in the system (e.g., $R_1$ and $R_n$ in FIG. 1) to establish proper line termination impedance to prevent signal level degradation and the presence of reflected signals, both conditions which can adversely affect the performance of the system. The termination impedances Z∅ and Z1 are also applied across the appropriate communications channels when a remote determines, as described below, that the communications link between it and its immediately adjacent higher or lower number remote is severed or sufficiently degraded that reliable data transmission can not be maintained therebetween. The determination as to communications link degradation can be made by providing each remote with a register for each communications channel that records in an cumulative manner the number of invalid messages received relative to the number of valid messages received from the immediately adjacent remote(s) and terminate one or both of the communications link CL∅ and CL1 in the direction of the remote from which the number of invalid messages received exceeds a threshold value. More preferably, however, each remote is provided with an active testing diagnostic routine to enable it to test the communication integrity of the communications link between it and its immediately adjacent remote(s) in accordance with the flow diagrams illustrated in FIGS. 11, 12A, 13B, and 12C.

Figure 11:
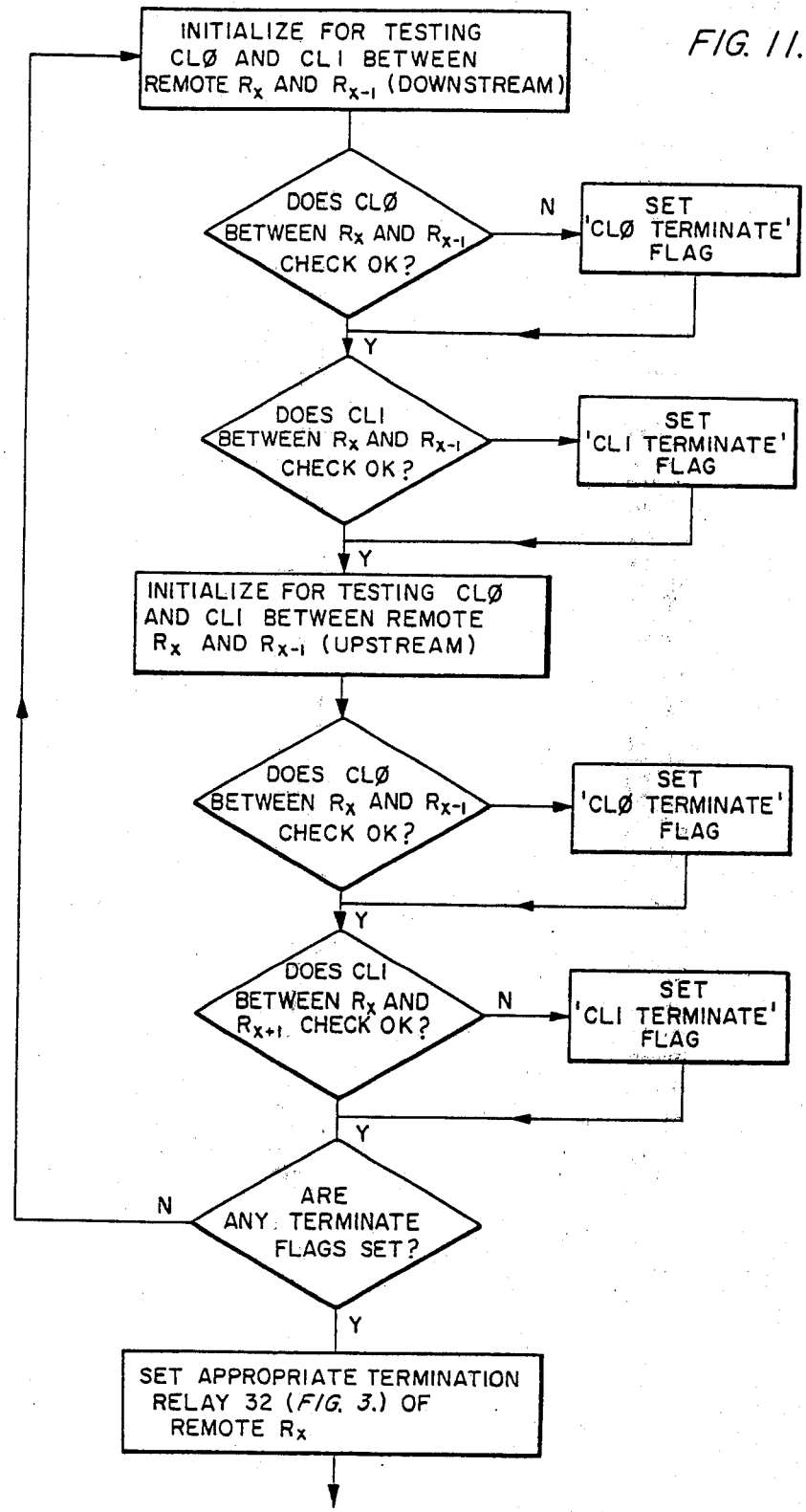
FIG. 11 is a flow diagram summary of the manner by which an interrogating remote $R_x$ tests the integrity of the communication link between it and the remotes $R_{x-1}$ and $R_{x+1}$ immediately adjacent thereto in the succession order.

The flow diagram illustrated in FIG. 11 is a summary of the manner by which each remote is capable of testing the communication integrity of the communications link between it and its immediately adjacent remote or remotes and terminating one or both of the communications links when a degraded or interrupted line condition is detected. As shown in FIG. 11, the remote $R_x$ is initialized and then, in sequence, tests the communications integrity of the communications link CL∅ in the downstream direction between it and its immediately adjacent lower number remote (that is, $R_{x-1}$) and then tests the communication integrity of the communications link CL1 in the downstream direction with the same remote. If either the communications link CL∅ or CL1 in the downstream direction is faulty, an appropriate flag is set in a register in the remote $R_x$ reserved for this purpose. In a similar manner, the remote $R_x$ then tests the communications integrity of the communications link CL∅ and CL1 in the upstream direction with its immediately adjacent higher number remote (that is, remote $R_{x+1}$) and sets the appropriate flag, as and if required. After this initial diagnostic checking takes place, the remote $R_x$ will terminate the failed communications line CL∅ and/or CL1 by actuating the appropriate relay contacts $32_0$ and/or $32_1$ as required. The line checking test utilized in FIG. 11 preferably takes place when the remote $R_x$ is master for the moment (that is, $R_m$).

A more detailed explanation of the communications line integrity check and automatic termination may be had by referring to FIGS. 12A, 12B, and 12C (as read in accordance with the flow chart legend of FIG. 13) in which FIG. 12A represents the downstream integrity check with the next lower number remote, FIG. 12B represents the upstream integrity check with the next higher number remote, and FIG. 12C represents the line termination function in response to the results of the integrity test performed in FIGS. 12A and 12B.

In FIG. 12A, the line checking diagnostic is started by first loading three registers or counters, namely, a 'retry counter,' a 'CL∅ retry counter,' and a 'CL1 retry counter' with an arbitrarily selected number, for example, five. The 'retry counter' is then decremented by one and a message sent from the remote $R_x$ to the remote $R_{x-1}$ requesting an acknowledgement ACK signal. If the communications link CL∅ and CL1 between the interrogating remote and the responding remote is fully functional, a valid ACK signal will be received by the interrogating remote $R_x$ on both C1∅ and CL1. The diagnostic checking will then route to the part of the program (FIG. 12B) for checking the communications integrity of the communications link CL∅ and CL1 between the interrogating remote $R_x$ and the next higher number remote in the system, that is, $R_{x+1}$. On the other hand, if a valid ACK signal is not received on one or both of the communications link CL∅ or CL1 by the requesting remote $R_x$ from the immediately adjacent lower number responding remote $R_{x-1}$, the appropriate retry counter (that is, 'CL∅ retry counter' or 'CL1 retry counter') will be decremented by one and the procedure repeated until the 'retry counter' is zero at which time the appropriate CL∅ and/or CL1 terminate flag register will be set; thereafter, the program will route to the upstream communications integrity check shown in FIG. 12B.

The flow diagram of FIG. 12B is basically the same as that of FIG. 12A except that the communiations integrity check occurs for that portion of the communications link CL between the interrogating remote $R_x$ and the next higher number responding remote $R_{x+1}$. More specifically, the three registers or counters, that is, the 'retry counter,' the 'CL∅ retry counter,' and the 'CL1 retry counter' are loaded with the arbitrarily selected value of five. The 'retry counter' is then decremented by one and a message sent from the interrogating remote $R_x$ to the remote $R_{x+1}$ requesting an acknowledgement signal. If the communications link CL∅ and CL1 between the interrogating remote $R_x$ and the responding remote $R_{x+1}$ is integral, a valid acknowledgement signal will be received by the interrogating remote $R_x$ and the program will route to the termination impedence portion of the procedure shown in FIG. 12C. On the other hand, if a valid acknowledgement signal is not received on one or both of the communications lines CL∅ or CL1 by the interrogating remote $R_x$ from the higher order responding remote $R_{x+1}$, the appropriate retry counter, that is, the 'CL∅ or CL1 retry counter' will be decremented by one and the precedure repeated until the 'retry counter' is zero at which point the appropriate CL∅ and/or CL1 termination flag register will be set; thereafter, the program diagnostic will route to the line impedence termination portion shown in FIG. 12C.

In the flow diagram of FIG. 12C, the various termination registers are examined for set flags and appropriate commands issued to the C-link control device 38 (FIG. 3) to terminate the line by appropriate actuation of the relay contacts $32_0$ and/or $32_1$. As is also shown in FIG. 12C, a line termination relay can also be released (that is, reset) to remove a previously applied line termination impedance. Accordingly, the system provides each remote with the ability to remove a line termination as well as apply a line termination. This particular feature is desirable when a communication link is temporarily degraded by the presence of non-recurring electrical noise to permit the system to automatically reconfigure its line impedences.

Figures 13, 14:
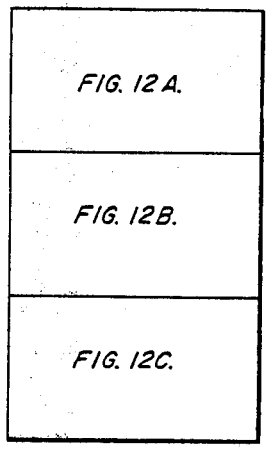
FIG. 13 is a legend illustrating the manner in which the flow diagrams of FIGS. 12A, 12B, and 12C are to be read.
FIG. 14 is an exemplary table illustrating the status of various counters when an interrogating remote $R_x$ is evaluating the integrity of the communications link in accordance with the flow diagram shown in FIG. 12A.

The following specific example illustrates the operation of the line termination procedure in which it is assumed that the communications link CL∅ in FIG. 1 is severed at point A as shown therein and that the remote $R_4$ is the present master $(R_m)$ of the system and testing the communications integrity of the communications link between itself as the interrogating remote $(R_x)$ and its next lower order number remote $R_3$ (that is, $R_{x-1}$). In accordance with the flow diagram of FIG. 12A, the 'retry counter,' and the 'CL∅ retry counter,' and the 'CL1 retry counter,' as shown in the tabulation table of FIG. 14, are set to the predetermined value of five. The 'retry counter' is decremented by one and the requesting interrogating remote $R_4$ $(R_x)$ requests an acknowledgement from the responding remote $R_3$ (that is, $R_{x-1}$). The requested acknowledgement will be provided on line CL1 but not line CL∅ because of the aforementioned interruption at point A (FIG. 1). The interrogating remote $R_4$, not receiving the requested acknowledgement signal on communications link $CL\emptyset$, will decrement the '$CL\emptyset$ retry counter' by one. Thereafter, the retest procedure will be sequentially continued with the '$CL\emptyset$ retry counter' being decremented with each additional unsuccessful attempt to obtain an acknowledgement from remote $R_3$ through the communications link $CL\emptyset$. When the 'retry counter' decrements to zero, the '$CL\emptyset$ retry counter' will also be decremented to zero at which time the $CL\emptyset$ lower order termination flag will be set. The remote $R_4$ will thereafter continue the diagnostic checking procedure to test the communications integrity of that portion of the communications link between the remote $R_4$ ($R_x$) and the next adjacent higher remote $R_5$ (that is, $R_{x+1}$) in accordance with the flow diagram of FIG. 12B. At the conclusion of the test of the communications link between the interrogating remote $R_4$ and the immediately adjacent lower number and higher number remotes $R_3$ and $R_5$, the termination relay contacts $32_\emptyset$ (FIG. 3) will be set to terminate the communications link $CL\emptyset$ at the remote $R_5$. In a similar manner, the remote $R_4$, when it becomes master for the moment, also apply a termination impedence across the communications link $CL\emptyset$.

As can be appreciated from the foregoing, the remotes $R_0 \ldots R_n$ have the ability, even when one or both of the communications links $CL\emptyset$ and $CL1$ are severed to still function on a master for the moment basis and also to effect appropriate line termination to minimize the adverse affect on digital data signal strength and the generation of reflected signals from mis-matched line impedance caused by deteriorated or severed communication lines. In addition, the system is self-healing, that is, when reliable communications is restored over the severed or degraded portion of the communications link the remotes $R_n$ will then again function to remove the line impedences to resume full system operation.

As will be apparent to those skilled in the art, various changes and modifications may be made to the Automatic Line Termination in Distributed Industrial Process Control System of the present invention without departing from the spirit and scope of the invention as recited in the appended claims and their legal equivalent.

What is claimed is:

1. An information transfer system for transferring digital information between stored-program controllers interconnected by a communications link each controller adapted to test the communications integrity of the communications link between it and other of the controllers and connect an impedance to the communications link in the event of an interruption or degradation of the communications integrity of the communications link between the controllers, each system comprising:

a plurality of stored-program controllers interconnected through a communications link, each controller provided with (a) transmitting and receiving means operatively connected to said communications link for transmitting and receiving digital information in messages of predetermined format to and from each other over said communications link, (b) message-checking means operably connected to said transmitting and receiving means for determining if transmitted messages are successfully received by the receiving controller, and (c) selectively operable switch means to selectively connect an impedance to said communications link, each controller including means to cause said transmitting and receiving means to transmit messages to other of said controllers and to provide an actuation signal to said switch means to cause said switch means to connect said impedance to said communications link in response to said message checking means determining that the number of messages successfully received by said other of said controllers is below a predetermined threshold.

2. The system claimed in claim 1 wherein said:

message checking means includes validity determing means for evaluating the validity of each message received from a transmitting controller and responding thereto with an acknowledgement message for a validly received message and a nonacknowledgement message for an invalidly received message, said transmitting controller determining the successful reception of its transmitted message by reception of the acknowledgement message.

3. The system claimed in claim 2 wherein said communications link comprises:

at least two independent communication channels connected to and extending between said controllers.

4. The system claimed in claim 3 wherein:

said means for transmitting associated with each controller is adapted to transmit identical messages on each of said communication channels.

5. The system claimed in claim 4 wherein:

said means for transmitting associated with each controller transmits each message at least twice on each channel and said message validity evaluating means associated with each controller effects evaluation of the received messages by at least comparing the plural messages transmitted on at least one of said plural communication channels.

6. The system claimed in claim 5 wherein:

said message validity evaluating means, after effecting said evaluation on said at least one channel, effects a comparison of the plural messages received on said other channel if the messages received on said at least one channel are not valid.

7. A system for controlling an industrial process, said system including a plurality of process controlling remotes interconnected by a common communications link and each adapted to test the communications integrity of the communications link between remotes and provide an impedance thereto in the event of an interruption or degradation of the communications integrity of the communications link between remotes, said system comprising:

a plurality of process controlling remotes interconnected through a communications link, each remote provided with (a) transmitting and receiving means operatively connected to said communications link for transmitting and receiving digital information in messages of predetermined format to and from each of the other remotes within the system, (b) message checking means operatively connected to said transmitting and receiving means for determining if the so-transmitted messages are successfully received, and (c) selectively actuatable switch means to selectively connect an impedance to said communications link;

each remote including means to cause said transmitting and receiving means to transmit messages to other of said remote and provide an actuation signal to said switch means to cause said switch means to connect said impedance to said communications link in response to said message checking means determining the number of messages successfully received by said other of said remote(s) is below a predetermined threshhold.

8. The system claimed in claim 7 wherein:
said message checking means including validity checking means for evaluating the validity of each message received from a transmitting remote and responding thereto with an acknowledgement signal for a validly received message and a non-acknowledgement signal for a invalidly received message, said transmitting remote determining the successful reception of its transmitted messages thereto by the acknowledgement messages received therefrom.

9. The system claimed in claim 7 wherein said communications link comprises:
at least two independent communication channels connected to and extending between said remotes.

10. The system claimed in claim 9 wherein:
said means for transmitting associated with each remote transmits identical messages on each of said plural communication channels.

11. The system claimed in claim 10 wherein:
said means for transmitting associated with each remote transmits each message at least twice on each of said plural communication channels and said message validity evaluation means effects evaluation by at least comparing the plural transmitted messages on said at least one channel of said communications link.

12. The system claimed in claim 11 wherein:
said message validity evaluation means, after effecting said evaluation of said plural messages transmitted on said at least one channel, effects comparison of the plural messages received on said other channel.

13. A method of providing a line-matching impedance in a communications link of an industrial process control system having a plurality of process controlling remotes interconnected by the communications link in the event of an interruption or degradation of the communications integrity of the communications link comprising the steps of:
providing at least a first one of said remotes with an impedance that is selectively connectable to the communications link;
transmitting a message from said first one of said remotes to a second one of said remotes;
evaluating the validity of the message received at the said second one of said remotes and sending a valid-message-received message from said second one of said remotes to said first one of said remotes if the test message is valid;
evaluating the communications integrity of the communications link between said first one of said remotes and said second one of said remotes as a function of a number of valid-message-received messages received by said first one of said remotes; and
connecting said impedance means to said communications link if the number of valid-messages-received messages received by said first one of said remotes is less than a predetermined value.

14. A method of providing a line matching impedance in a communications link of an industrial process control system having a plurality of remotes $R_0, R_1, \ldots R_{x-1}, R_x, R_{x+1} \ldots R_{n-1}, R_n$ interconnected by a common communications link in the event of an interruption or degradation of the communications integrity of the communications link, comprising the steps of:
(a) providing at least one of said remotes $R_x$ with an impedance means that is selectively connectable to said communications link;
(b) transmitting a test message from the remote $R_x$ to a selected one of the remotes $R_{x+1}$ or $R_{x-1}$;
(c) evaluating the validity of the test message sent to said selected one remote from the remote $R_x$;
(d) responding to a validly received message by said selected one remote by transmitting a valid-message-received message to the remote $R_x$;
(e) evaluating the communications integrity of the communications link between the remote $R_x$ and the selected one remote as a function of the valid-messages-received messages by the remote $R_x$;
(f) connecting the impedance means to the communications link when the number of valid-messages-received messages is below a predetermined value; and
(g) repeating the steps (b) through (f) for the other one of the remotes $R_{x+1}$ or $R_{x-1}$.

15. An information transfer system as recited in claim 1, wherein said predetermined threshhold is a plurality.

16. A system for controlling an industrial process as recited in claim 7, wherein said predetermined threshhold is a plurality.

17. A method as recited in claim 13, wherein said predetermined value is a plurality.

18. A method as recited in claim 14, wherein said predetermined value is a plurality.

19. An information transfer system comprising a multiplicity of stations, a communications link interconnecting said stations, each station provided with (a) a stored-program controller, (b) transmitting and receiving means connected between said stored-program controller and said communications link for transmitting digital information from said stored-program controller over said communications link in messages of predetermined format to another one of said stations and for receiving digital information from another one of said station over said communications link in messages of predetermined format, and (c) switch means selectively operable under the control of said stored-program controller to connect an impedance to said communications link, the stored-program controllers including message checking means for determing if the transmitted messages are successfully received by the transmitting and receiving means of the receiving station.

* * * * *

UNITED STATES PATENT AND TRADEMARK OFFICE
CERTIFICATE OF CORRECTION

PATENT NO. : 4,402,082
DATED : Aug. 30, 1983
INVENTOR(S) : Michael E. Cope

It is certified that error appears in the above-identified patent and that said Letters Patent are hereby corrected as shown below:

On the title page

Please change the Assignee from "FOSTER WHEELER ENERGY CORPORATION, Livingston, New Jersey" to --FORNEY ENGINEERING COMPANY, Carrollton, Texas --.

Signed and Sealed this

Twenty-eighth Day of February 1984

[SEAL]

Attest:

GERALD J. MOSSINGHOFF

Attesting Officer — Commissioner of Patents and Trademarks